US005091819A

United States Patent [19]

Christiansen et al.

[11] Patent Number: 5,091,819

[45] Date of Patent: Feb. 25, 1992

[54] GAS-ELECTRONIC SWITCH (PSEUDOSPARK SWITCH)

[76] Inventors: Jens Christiansen, An den Hornwiesen 4, D-8521 Erlangen-Buckenhof; Klaus Frank, Eichenring 30, D8551 Röttenbach; Werner Hartmann, Forchheimer Weg 14, D-8551 Röttenbach; Claudius Kozlik, JUMLa/ gerstrasse 47, D-8500 Nürnberg, all of Fed. Rep. of Germany

[21] Appl. No.: 327,984

[22] PCT Filed: Jun. 30, 1988

[86] PCT No.: PCT/EP88/00574

§ 371 Date: Feb. 23, 1989

§ 102(e) Date: Feb. 23, 1989

[87] PCT Pub. No.: WO89/00354

PCT Pub. Date: Jan. 12, 1989

[30] Foreign Application Priority Data

Jun. 30, 1987 [DE] Fed. Rep. of Germany ....... 3721529

[51] Int. Cl.[5] ........ H02H 9/04

[52] U.S. Cl. ........ 361/120; 361/130; 313/306; 313/231.11

[58] Field of Search ........ 361/112, 120, 129, 130; 313/306, 325, 231.11, 591

[56] References Cited

U.S. PATENT DOCUMENTS 4,433,354 2/1984 Lange et al. ........ 361/120

4,628,399 12/1986 Shigemori et al. ........ 361/120

OTHER PUBLICATIONS

Journal of Physics EiScientific Instruments, Jun. 1986, pp. 466–470.

*Primary Examiner*—Todd E. Deboer

*Attorney, Agent, or Firm*—Dvorak and Traub

[57] ABSTRACT

The switch has a gas discharge chamber, in which two electrodes, namely a cathode (11) and an anode (12), are contained, which are spaced a distance (d) apart and are separted from each order by an electrically insulating wall (9*a*) made of ceramic material or of glass. The cathode (11) is formed with a hole (5). The electrodes (11, 12) are joined to the insulating wall (9*a*) by a tight metal-ceramic joint or fused joint. The gas discharge chamber is filled with an ionizable low-pressure gas under such a pressure p that the product p×d has such a value that a gas discharge between the electrodes (11, 12) will be fired in response to a voltage applied thereof which is disposed in that branch of the firing voltage-pressure characteristic in which the firing voltage descreases as the pressure rises.

30 Claims, 10 Drawing Sheets

GAS-ELECTRONIC SWITCH (PSEUDOSPARK SWITCH)

TECHNICAL FIELD

This invention relates to a gas-electronic switch (pseudospark switch) having a gas discharge chamber, which contains two metal electrodes, namely, a cathode and an anode, which are spaced a distance (d) apart and are separated from each other by an electrically insulating wall made of ceramic material or glass, the cathode has a hole and the electrodes are joined to the insulating wall by a tight metal-ceramic joint or fused joint, wherein the gas discharge chamber is filled with an ionizable low-pressure gas under such a pressure p that the product p×d has such a value that a gas discharge between the electrodes will be fired in response to a voltage applied thereto which is disposed in that branch of the firing voltage-pressure characteristic in which the firing voltage decreases as the pressure rises.

PRIOR ART

Such a switch has been disclosed in DE-28 04 393 C2. In that switch, electrons and/or ions are generated in a discharge vessel which contains spaced apart metal electrodes, which are held by a surrounding insulating wall and have a gas discharge passage, which is constituted by aligned openings in said electrodes. Said discharge vessel is filled with an ionizable gas, which in accordance with the teaching of DE-28 04 393 C2 is present in such a quantity that the product of the electrode spacing (d) and the gas pressure (p) is of an order of 130 pascals or less. The sparklike fast gas discharge which will result when such switch is triggered or which takes place spontaneously as soon as the breakdown voltage is exceeded is known in the literature as the pseudospark voltage. In an extension of the p×d range explained in DE-28 04 393 C2 that pseudospark voltage will occur at p×d values which have a decreasing firing voltage-pressure characteristic as the pressure rises. In the language which is conventional for plano-parallel electrodes that pressure range corresponds to the "disruptive gas discharge at the left-hand branch of the Paschen curve". That left-hand branch succeeds the minimum in he characteristic curve in which the breakdown voltage is plotted against p×d. In this patent specification we describe as pseudosparks all gas discharges which are spontaneously fired under pressures which in a given switch are lower than the pressure which defines the minimum of the gas pressure - firing voltage characteristics of the system. The plate spacing (d) is defined as that distance between the cathode and anode near their hole which determines the pseudospark character of the gas discharge and which must be provided in the cathode and may be provided in the anode.

The literature contains numerous papers on the properties and the operation of pseudospark chambers and pseudospark switches. Their insulating wall is usually arranged to extend at right angles to the electrodes (FIG. 1) and to have a length that is equal to the electrode spacing. Almost all published investigations have been made for scientific purposes so that the life and the existence of a permanently gas-filled switch were not significant.

It is an object of the invention to provide a pseudospark switch which has a life that is sufficiently long for industrial use and is capable of numerous switching operations and in which undesired spontaneous breakdowns will be avoided as far as possible.

SUMMARY OF THE INVENTION

That object is accomplished by a switch having the features recited in the claims. Additional desirable features of the invention are recited in the dependent claims.

Glass or a ceramic material is used for the insulating wall of the switch in accordance with the invention and is so joined to the electrodes that there can be no appreciable delivery of gas to the system during the operation of the switch. The invention ensures that a diffusion of metal vapor, which may originate substantially at the electrodes close to the holes formed in the cathode and possibly in the anode, to the insulator wall and a deposition of such metal vapor on said wall will be hindered. That hindrance of the diffusion will particularly be effected by the shields. In spite of such shields, diffusing metal vapor might deposit on the insulators during a long-time operation of the switch and might result in the formation of a conductive bridge unless this is opposed which ensures that the deposition region, which is substantially disposed in the continuation of the diffusion path, is interrupted by a protected zone of the insulating wall between the cathode and anode. This is accomplished in that the electrodes have such a shape that the lines of contact between the electrodes and the insulator are hidden behind narrow slotlike recesses so that the electric field can extend only slightly through said slots. As a result, the initiation of a discharge will substantially be suppressed there even in case of a slight deposition of vapor on the insulator wall.

EMBODIMENTS OF THE INVENTION

Figure 1:
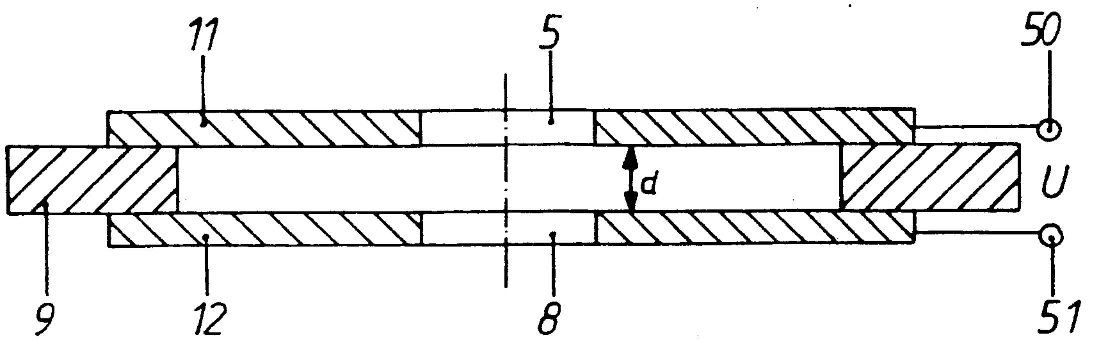
PRIOR ART Fig.1
FIG. 1 shows diagrammatically the basic elements of a gas discharge chamber for effecting a pseudospark gas discharge as is apparent from the prior art.

Like or corresponding parts are designated with the same reference numerals in the various illustrative embodiments.

FIG. 1 shows the basic design of a discharge vessel provided with a cathode 11 and an anode 12, which are platelike and are parallel to each other and are spaced a distance d apart and are gastightly joined by an annular insulating wall 9. The cathode 11 has a central hole 5. Opposite to the latter, the anode 12 contains another hole 8. A voltage which may be between 5 kV and 50 kV or may be lower or higher is applied to the cathode and anode via terminals 50 and 51 so that the pseudospark gas discharge may take place in the gas discharge passage formed by the holes 5 and 8 when the gas pressure is properly adjusted. The gas may be enclosed in a housing, which tightly surrounds the illustrated assembly.

Figure 2:
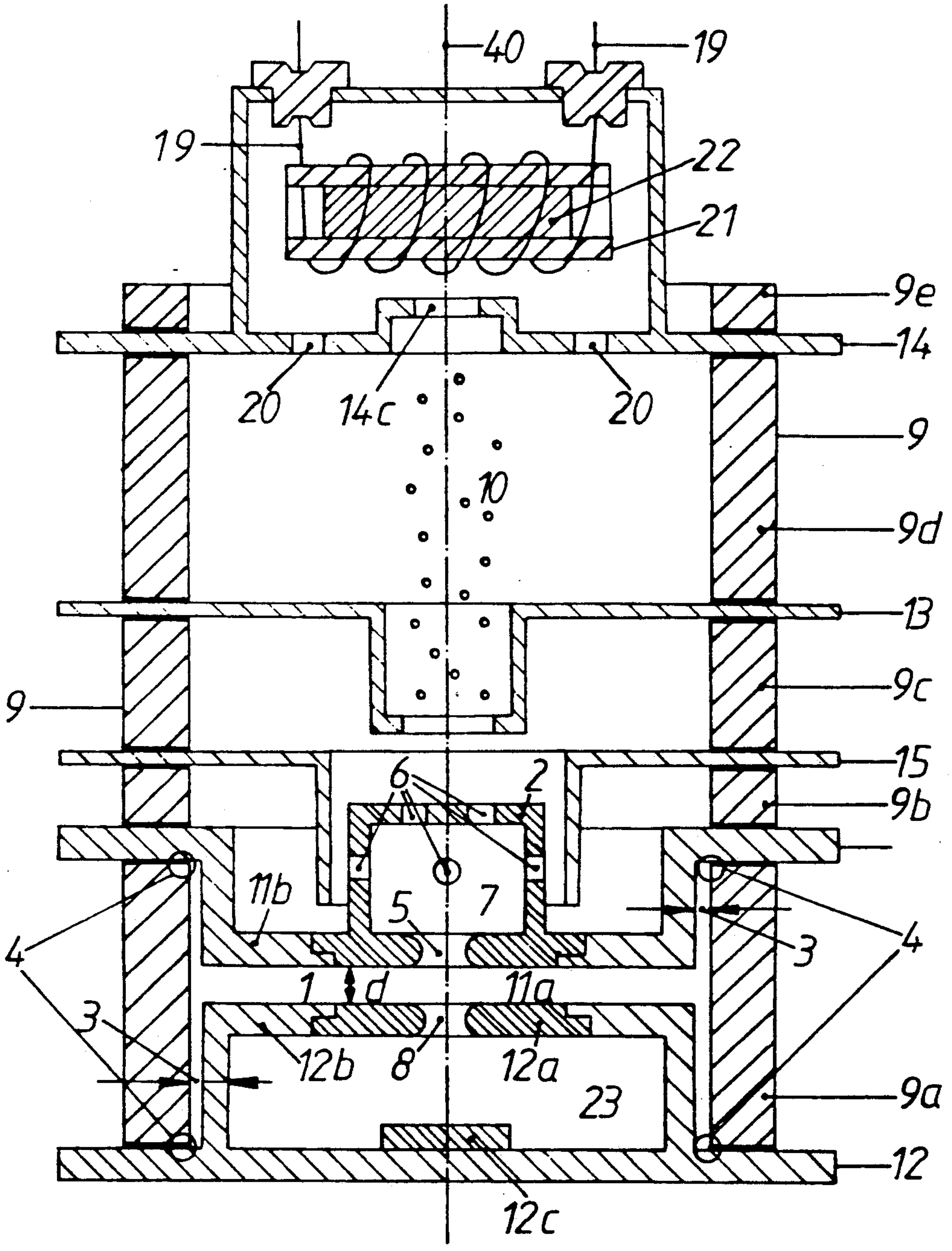
FIG. 2 shows diagrammatically a gas discharge chamber in accordance with the invention with the associated electrodes.

FIG. 2 shows an embodiment of the assembly of the electrodes and insulating wall in accordance with the invention. The gas discharge chamber is formed in a cylindrical vessel, which has an electrically insulating wall 9, which consists of a plurality of sections 9*a*, 9*b*, 9*c*, 9*d* and 9*e*, which are arranged one behind the other. In the gas discharge chamber, an anode 12, a cathode 11, a shield 15 and two auxiliary electrodes 13 and 14 are arranged one behind the other. The auxiliary electrodes are separated from each other by the various sections of the insulating wall 9 and are gastightly joined thereto. The wall 9 consists of glass or of a ceramic material. The anode 12 defines the discharge chamber at one end. The remaining electrodes extend radially outwardly through the wall 9 between its sections 9*a* to 9*e*.

A metal cage 2 is provided on the rear of the cathode 11 and has a cavity 7, which communicates through openings 6 with the space behind the cathode and through a hole 5 with the space 1 between the cathode 11 and the anode 12. Another metal cage is provided on the rear of the anode 12 and has an interior space 23 which communicates through a hole 8 with the space 1 between the anode 12 and the cathode 11. A hard metal plate 12*c* is disposed on the rear wall of the anode cage. The central portion of the rear auxiliary electrode 14 consists also of a hardmetal. The hardmetal is used to increase the strength of those parts of the electrodes which are particularly highly stressed by the impact of charge carriers.

The entire system has rotational symmetry. The axis of symmetry 40 is also the axis of the two holes 5 and 8 at the center of the cathode 11 and of the anode 12, respectively. In the regions 11*a* and 12*a* around the holes 5 and 8, the cathode 11 and the anode 12 are flat and consist of a hardmetal. In their outer portions 11*b* and 12*b* they consist of copper or of an alloy having a coefficient of expansion which is lower than that of copper and nearer to that of the wall 9, e.g., of COVAR. But close to the section 9*a* of the wall 9 the anode and the cathode are set back to define a narrow annular gap 3 and only at some distance from the front face of the electrodes extend out of the gas discharge chamber. When a voltage is applied to the cathode 11 and anode 12 the electric field in the annular gap 3 is almost at right angles to those surfaces of the electrodes which face the wall 9. This can be accomplished in a narrow region, in which the annular gap 3 is narrower than the distance d between the anode 11 and 12 in the space 1 between the holes, because the electric field will then strongly be reduced as it enters the annular gap 3. This will ensure that there can be virtually no acceleration of charge carriers into the annular gap 3 so that the critical region at the line of contact between metal, insulator 9*a* and gas extends virtually in a field-free space and can no longer be a substantial origin of charge carriers. This is also important for the suppression of possible sliding discharges, which could otherwise form on the surface of the insulator when high voltages are applied while the switch is in a holding state. Said sliding discharges would constitute undesired breakdowns and could particularly easily occur at said triple point-like lines of contact 4.

That important measure for the long-time stability of pseudospark switches, particularly of high-current switches, will be most effective is such narrow gap 3 is provided between *both* main electrodes (cathode 11 and anode 12) of the switch and the insulating wall 9*a* so that the electrode leadthroughs through the wall 9 are actually geometrically set back relative to plano-parallel electrodes (FIG. 1). But an essential result for the purposes of the invention will be produced even when the electrode leadthrough is set back for only one of the two electrodes 11 and 12, as is called for in claim 1.

The gas discharge taking place during a switching operation is characterized in that when the switching operation has been fired a plasma beam enters the space behind the cathode 11 and undesirably illuminates the wall 9 and transports electrode material into the gas phase by the photoelectric effect and by sputtering processes also in that region so that it is advisable also in that region to take measures to hinder the diffusion of the electrode material to the insulator wall 9. In accordance therewith the assembly shown in FIG. 2 comprises a shield 15, which shields part of the openings 6 of the cathode cage 2, and the glow discharge electrode 13 disposed in the space behind the cathode is designed to contribute also to the shielding of the openings 6 of the cathode cage 2. In the illustrative embodiment shown in FIG. 3 the glow discharge electrodes 13 and 14 are provided with annular extensions 16 and 17, which are parallel to and shield the wall 9 and partly overlap each other.

Figure 3:
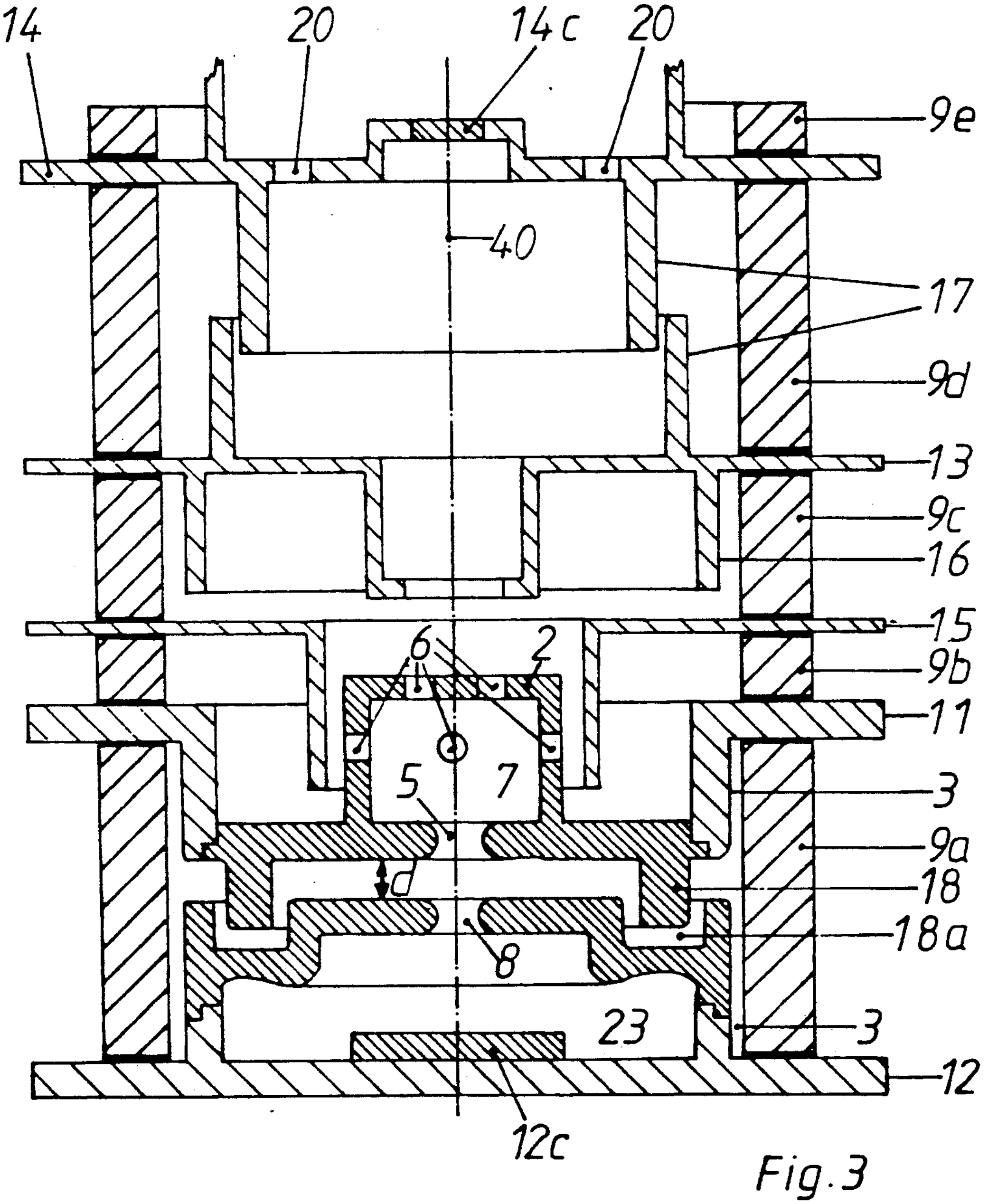
FIG. 3 is a longitudinal sectional view showing a second illustrative embodiment of a gas discharge chamber having an electrode array which differs from the example shown in FIG. 2.

Similarly, in the illustrative embodiment shown in FIG. 3 the cathode 11 and the anode 12 are so designed that the pseudospark discharge taking place between them cannot directly illuminate the section 9*a* of the wall 9. For that purpose the cathode 11 has an annular extension 18, which is parallel to the wall 9 and which extends into an annular recess 18*a* of the anode 12.

The interaction of the plasma with the walls of the gas discharge chamber results particularly under a high-current load in a gradual decrease of the gas pressure (the filling gas preferably consists of hydrogen and/or deuterium) because ions of the gas discharge diffuse into the electrodes and into the insulating walls 9*a* to 9*e* and because the metal vapor which is present acts as a getter. Besides, hydrogen and deuterium may chemically combine with impurities in the electrode material and may also be lost owing to their relatively high solubility in metals such as copper and nickel. For this reason it makes sense to use a hermetically tight gas discharge chamber and particularly one which has been fusion-sealed and in which gas which has become lost may be replaced by measures which can be influenced from the outside.

This is effected by means of the hydrogen accumulator. Such hydrogen accumulator 22 is shown in FIG. 2. It consists of a cylindrical body 22 that is made of a hydrogen-sorbing metal, such as titanium, which consists in an open-ended sleeve 21, which consists e.g., of nickel, and is heated by an electric resistance heater 19. The accumulator 22 is held at a temperature at which an equilibrium pressure which is suitable for the pseudospark discharge results in the gas filling. That temperature may be about 600° C. in a titanium accumulator. The accumulator 22 is disposed in a chamber that is disposed behind the outer glow discharge electrode 14 and which communicates through holes 20 in the glow discharge electrode 14 with the space 10 that is disposed behind the cathode and in which the glow discharge is effected.

Figure 4:
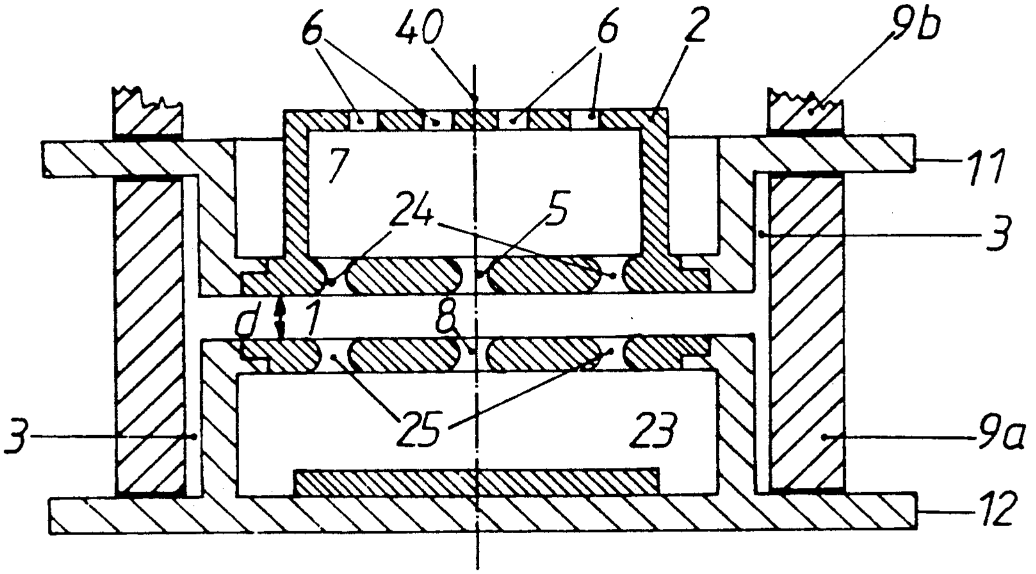
FIG. 4 shows for a gas discharge chamber as is shown in FIG. 2 a modified design of the anode and cathode, which have a plurality of holes each.

Other embodiments of the switch which are characterized by the use of two main electrodes (cathode 11 and anode 12) having one hole each whereas there are no additional electrodes between the anode and the cathode (see FIGS. 2, 3 and 4).

In additional embodiments the switches can handle high currents with high switching capacities even in long-time operations. If such switches comprise a cathode 11 and preferably also an anode 12 having a plurality of holes 5, 24 or 9, 25, as shown in FIG. 4, it will be possible to effectively and optimally avoid destructions which could be effected by such high currents. Such measures will obviously have the result that an increase of the power in such switches will reveal possible weak points which will become apparent only at high powers whereas they would not be significant otherwise.

In high-duty switches in which the insulators are protected as is taught by the invention the next-susceptible region of the switch is that electrode space in which he electron current which carries the switch current is initiated at the cathode 11. It has been found that the contact of the plasma occurs substantially in the hole 5 and that a certain area, depending on the voltage and current involved in the switching operation, is substantially responsible for making charge carriers available. Typical values in that connection are, e.g., electron-releasing areas of an order of 1 $cm^2$ adjacent to the hole 5 in the case of typical currents of 10 kA. The resulting current density is directly correlated with the life of the electrode surfaces. For this reason a further feature of the invention resides in that the stability of the electrode is a prolonged and the life of the switches is thus increased in that a suitable electrode material is selected, such as is recited in claim 9, and measures are adopted to increase the surface area which carries current during the switching operation. In that connection it has been found that a pseudospark discharge will take place in the desired sense even when the cathode 11 contains not only *one* hole 5 but *a plurality of* parallel holes 5, 24, as is shown in FIG. 4, and the distances between said holes 5, 24 and their diameters should be of the order of the electrode spacing (d) near the holes 5, 24. (Larger and smaller dimension differing by as much as a factor of 5 are still permissible.) In that case the discharge will generally be initiated first at one of the holes 5, 24, e.g., by a triggering to be described hereinafter, but the discharge will automatically spread during the switching operation to the region of all existing holes 5, 24. As a result, the current load in the regions around the several holes 5, 24 will highly be reduced because the current is distributed over a larger area.

Also described are various triggering methods for initiating pseudospark discharges and to switches designed for that purpose. They all assume an injection of a plasma or an injection of charge carriers from a low-pressure gas discharge (glow discharge). For this purpose, as is shown in FIG. 2, two additional electrodes 13 and 14 are provided behind the cathode 11. That of said electrodes which is adjacent to the cathode 11 is the glow discharge electrode 13, which may be positive or negative, i.e., it may serve as the cathode or as the anode of the glow discharge system. The substantial glow discharge current flows from that electrode to the opposite electrode 14, which is at a potential which is substantially as high as the potential at the cathode 11 of the switch (or at a potential which is substantially as high as the potential of the anode in the improved switch defined in claims 14, 15 and 16). The electrode 13 is in such a spatial position that the glow discharge current can bifurcate to the cathode 11 of the switch and to the opposite electrode 14, which is approximately at the same potential as the electrode 11. The bifurcation of the current is suitably effected in such a manner that only a small part of the glow discharge current flows toward the cathode 11 of the switch, which in that case will be reinforced by other measures. In order to perform a non-fluctuating switching operation it is advisable so to adjust the bifurcation of the current that an appreciable continuous current will enter the region of the hole 5 of the cathode 11 (typical values which can be selected in a practical arrangement for that continuous current lie between $10^{-7}$ and $10^{-5}$ amperes). That charge carrier current entering the hole 5 of the cathode 11 of the switch has the effect that a small background plasma will always be present there. This has the result that only low stochastic fluctuations will occur at the beginning of the switching operation. It is virtually not necessary to wait for the electron used to initiate the pseudospark discharge sot hat the stand-by statistics which exhibit high stochastic fluctuations will not be effective whereas smaller statistical fluctuations will occur which depend on the power of the plasma which is continuously present adjacent to the hole in the cathode. The fact that such charge carrier current is always present has the result that the strength of the plasma which has additionally been injected by a triggering operation and the strength of a plasma which has additionally been initiated by a controlled photoelectric interaction caused by the illumination of the space 7 behind the electrode 11 may be low. Analogously, such an always present charge carrier current will greatly improve the precision of the initiation of the switching operation in response to an overvoltage in a switch.

A special advantage of the switch in accordance with the invention resides in that it can be fired even if the polarity has been removed so that the cathode 11 is an anode and the anode 12 is a cathode. This is not possible with thyratrons.

Also described is a new method of triggering the pseudospark switch. In that method the switching operation is initiated in that the breakdown voltage is exceeded in an external switching circuit. But this takes place when the direct-current glow discharge is present, which through the holes 6 in the shielded cavity 7 behind the cathode 11 (which for example becomes the anode) interacts with the holes 5 and 8 in the main electrodes 11 and 12 of the pseudospark switch. In a novel manner the above-mentioned charge carrier current enters through the holes 5 and 8, so that the breakdown point on the firing voltage characteristic is slightly decreased and the above-mentioned decrease of the statistical fluctuations of the switching delay is also effected because a large number of charge carriers are always present in the accelerating field of the switch. The reliability of the switch is also highly improved by that dark current. For this reason the novel switch can be used in fields in which a radioactive preionzation is very essentially required in other processes of generating charge carriers, namely:

(1) The use of the pseudospark switch in a switching chain of Marx generators (previous triggering method: by a photoelectric current from high-power lasers, by radioactive radiators for preionizing, and by spark gaps, which involve high jitter values).

(2) The use of the pseudospark switch in overvoltage switches (so-called overvoltage arresters). Commercially available overvoltage arrestors often use also a radioactive preparation for a preioinization in order that they can effect a sharp triggering).

(3) The use in crowbar switches for a protection of electric plants and machines.

(4) The use as a pulse generator and pulse former (e.g., as a small switch or also as a transfer element for a transmission of electric energy in pulse power plants).

Figure 5:
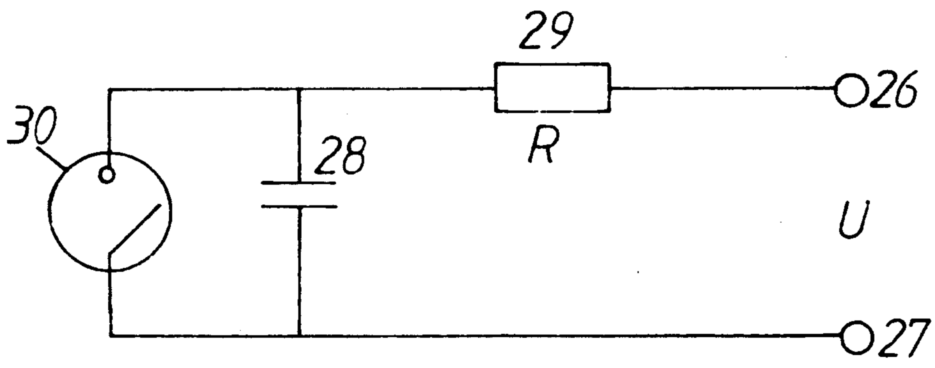
FIG. 5 is a circuit diagram showing the use of a switch in accordance with the invention for arresting overvoltages in an electric network.

The improved switch in accordance with claim 26 in particularly adapted for use as an overvoltage arrester. By external and generally passive electrical measures the switch 30 (FIG. 5) may be quenched in such a manner that a controlled voltage to be provided by the triggering of the switch can be defined for the consumer which is to be protected against an overvoltage. FIG. 5 illustrates the use of the switch 30 for such purpose. The voltage between the terminals 26, 27 is to be lowered by a current bypass when the voltage exceeds a certain value U. The control will be discontinues as soon as that voltage has been decreased below the value U by the response of the switch. This is accomplished in that, e.g., a resistance-capacitance circuit 28, 29 is connected between the switch 30 and the consumer (terminals 26 and 27). (The capacitor C (28) is parallel to the switch 30.) In that case the firing of the switch 30 will effect an almost complete discharge of the capacitor 28. The switch 30 is quenched after a short time and will again be fired when the voltage across the quenched switch 30 rises again and the voltage across the terminals 26, 27 of the consumer to be controlled has not been decreased sufficiently. The switch will not be fired if the voltage has sufficiently been decreased. Otherwise the cycle will continually be repeated until the voltage has been decreased below the pregiven value.

A triggerable Marx generator may be so designed that one switch of the switch chain in a multi-stage Marx generator is triggered in the conventional manner and a precisely timed breakdown in the other switches connected in series is effected.

Figure 6:
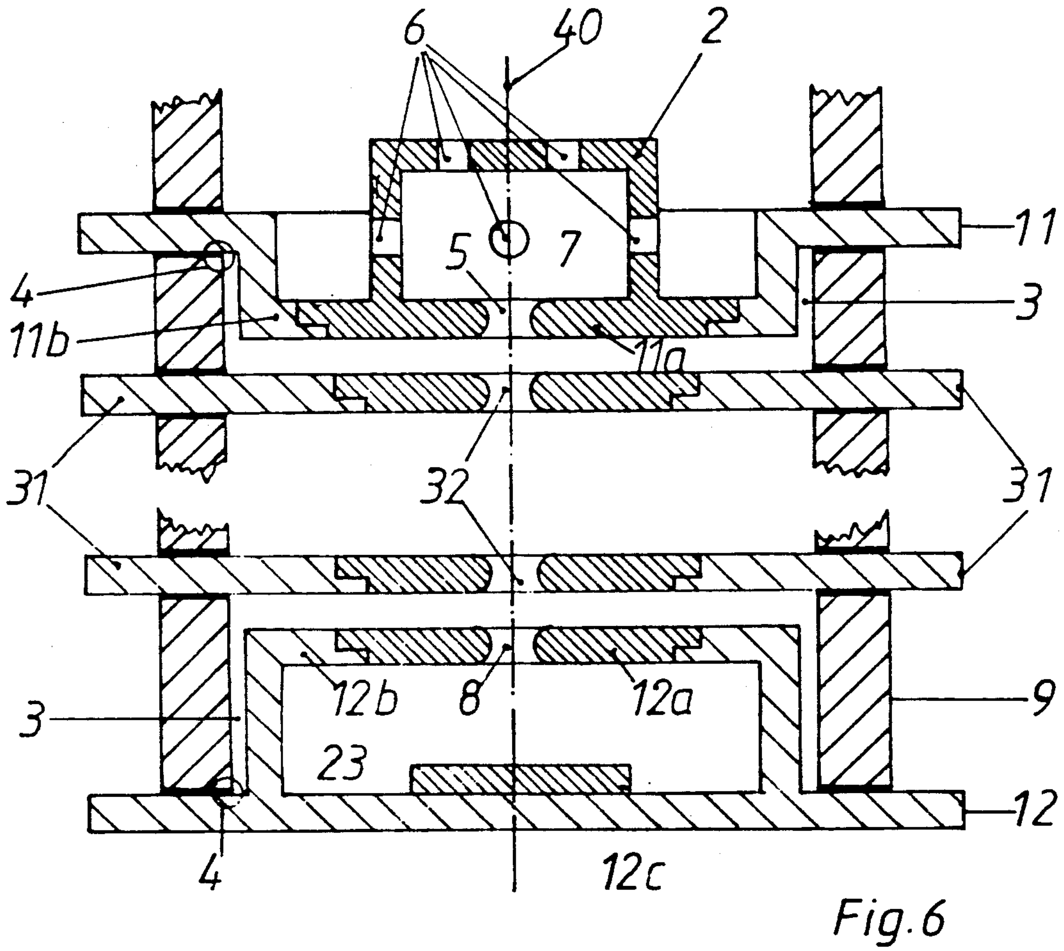
FIG. 6 shows a modification of the illustrative embodiment shown in FIG. 2 with auxiliary electrodes between the cathode and anode.
Figure 7:
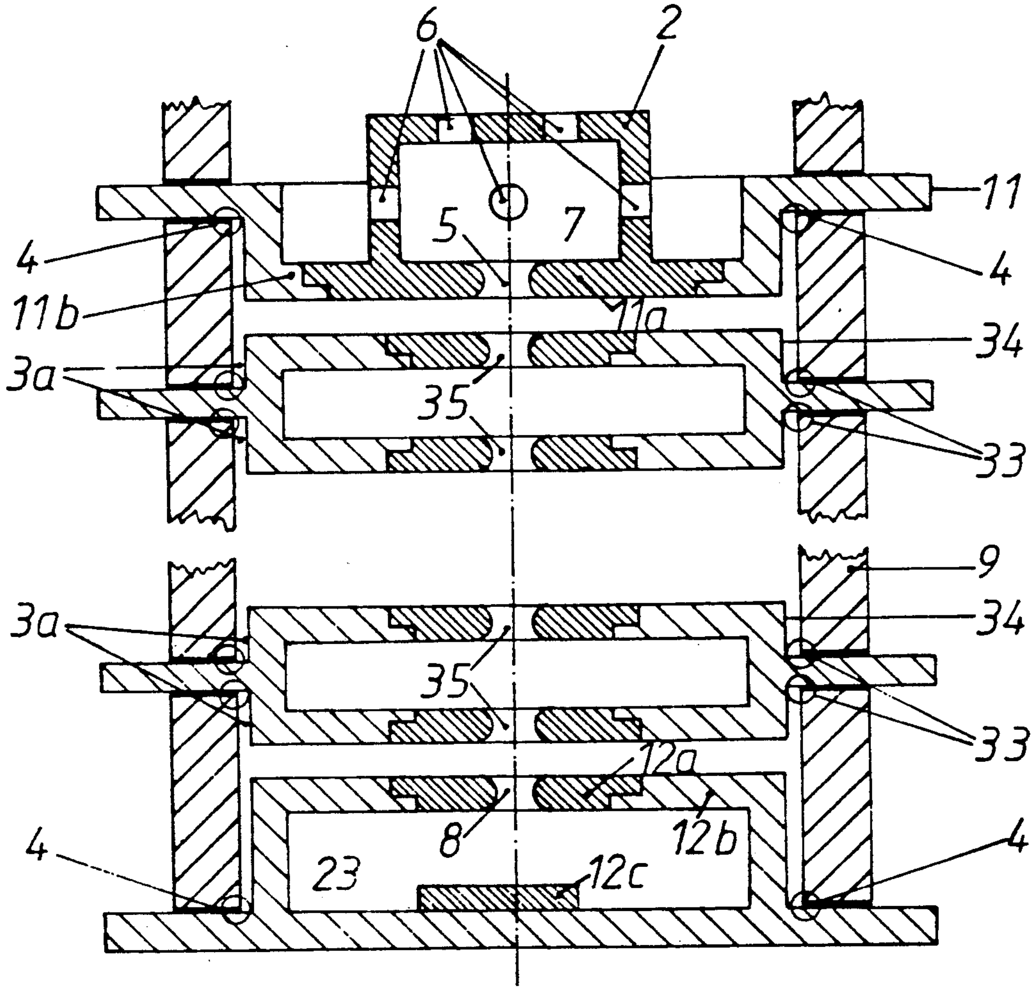
FIG. 7 shows a modification of the electrode array shown in FIG. 6 in which the auxiliary electrodes disposed between the cathode and anode are hollow.
Figure 8:
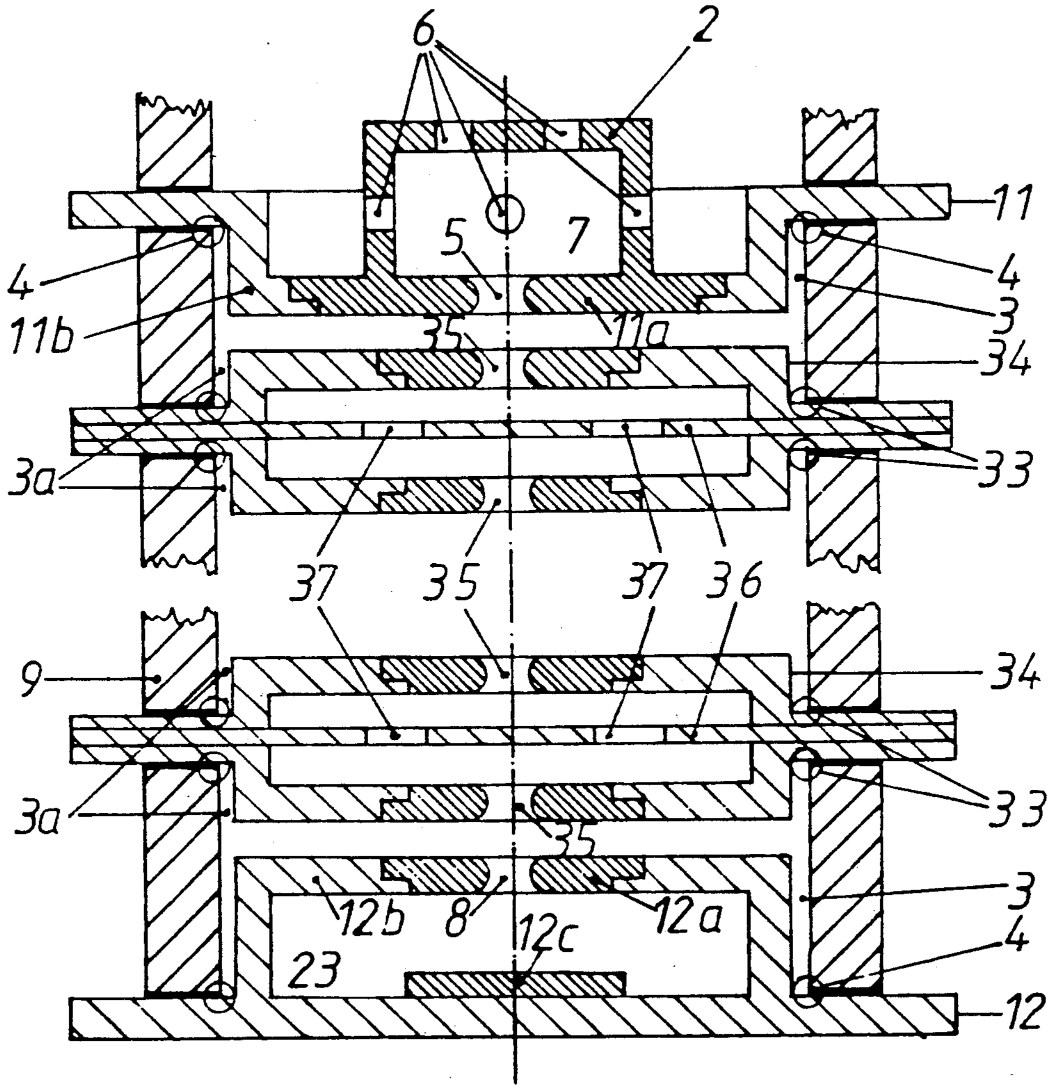
FIG. 8 shows a modification of the electrode array that is shown in FIG. 7 with a sheet metal shield disposed in the cavity of the auxiliary electrodes.

Because the distance along which a sliding discharge can be effected on the surface of the insulating wall 9 is increased in accordance with the invention, it is possible to design switches which can hold very high voltages in operation. A technical limit which is imposed by the filling gas lies between about 50 and 100 kV. In order to avoid instabilities, the pressure p required for that purpose should be as high as possible so that for holding a predetermined voltage the electrode spacing (d) should be minimized. In that case the technical limit is determined by the field emission of electrons adjacent to the holes 5, 8 and by the fact that instabilities and fluctuations in the holes will be likely to arise if the distances d between the anode 12 and the cathode 11 are small and the holes 5, 8 are relatively large because the firing voltage characteristic will be extremely steep in that case. For this reason it will be desirable to provide interposed electrodes 31 (FIG. 6) or 34 (FIGS. 7 and 8) between the cathode 11 and the anode 12 as is shown in FIGS. 6 to 8. Such interposed electrodes may be floating or may be connected to voltage dividers, which are disposed outside the gas discharge chamber and which in case of three interposed electrodes may apply, e.g., to the electrodes the following potentials related to the potential at the cathode 11:

Cathode: 0 Volt

Interposed electrode adjacent to the cathode: about 15 kV

Intermediate interposed electrode: about 30 kV

Interposed electrode adjacent to the anode: about 45 kV

Anode: 60 kV

The breakdown voltage will substantially be increased by said interposed electrodes 31 and 34, which suitably extend parallel to the cathode 11 and the anode 12. In case of a given distance between the cathode 11 and the anode 12 across the interposed electrodes 31, 34 the pressure may be relatively high even when high voltages are held and the electric field strength in the several spaces between the electrodes 11, 12, 31, 34 will be relatively high. This will result in a much higher stability of the switching system to fluctuations, in a lower gas consumption and in a substantial decrease of the rate at which the electrode material is sputtered. The susceptibility of sliding discharges along the insulating wall 9 is also greatly reduced because the field strength is lower.

In accordance with claim 21 the interposed electrodes 31 consist of parallel plates, which are disposed between the cathode 11 and the anode 12 and incorporated in the insulating wall 9.

In accordance with claim 21 the interposed electrodes 31 consist of parallel plates, which are disposed between the cathode 11 and the anode 12 and incorporated in the insulating wall 9.

In accordance with the invention the interposed electrodes 34 comply with the technical teaching which has been furnished for the anode 12 and the cathode 11 in that those lines of contact 39 between the interposed electrodes 34 where metal, gas and insulator 9 meet are protected by a gap 3*a* from an entrance of the electric field which originates at the respective opposite electrodes. To that end the interposed electrodes consist of hollow disks, which only at the center of their periphery have an annular projection by which they are held in the insulating wall 9.

In both cases the interposed electrodes 31 and 24 obviously have holes 32 and 35, respectively, which are aligned to constitute a passage in which the pseudospark discharge occurs.

The cavity in the interposed electrodes 34 of the illustrative embodiment shown in FIG. 7 is a substantially field free space. In the improved switch which is covered by claim 23 and shown in FIG. 8 the cavity of the interposed electrodes 34 contains a sheet metal shield 36, which interrupts the straight path between the cathode 11 and the anode 12. To ensure that the charge carriers can nevertheless move from the anode to the cathode the sheet metal shield obviously must not completely block the passage through the respective interposed electrode 34. For this reason, holes 37 are suitably provided in the sheet metal shield 36 laterally of the holes 35 and permit the charge carriers to move to the anode only on a detour. That measure affords the advantage that the breakdown voltage is increased further because the electrons are not so highly accelerated. Another favorable result resides in that less X-radiation will occur and less damage will be suffered by the parts of the gas discharge chamber. In spite of the sheet metal shields 36, a pseudospark discharge will occur because the plasma effects a coupling through the lateral holes 37 in the sheet metal shields.

Figure 9:
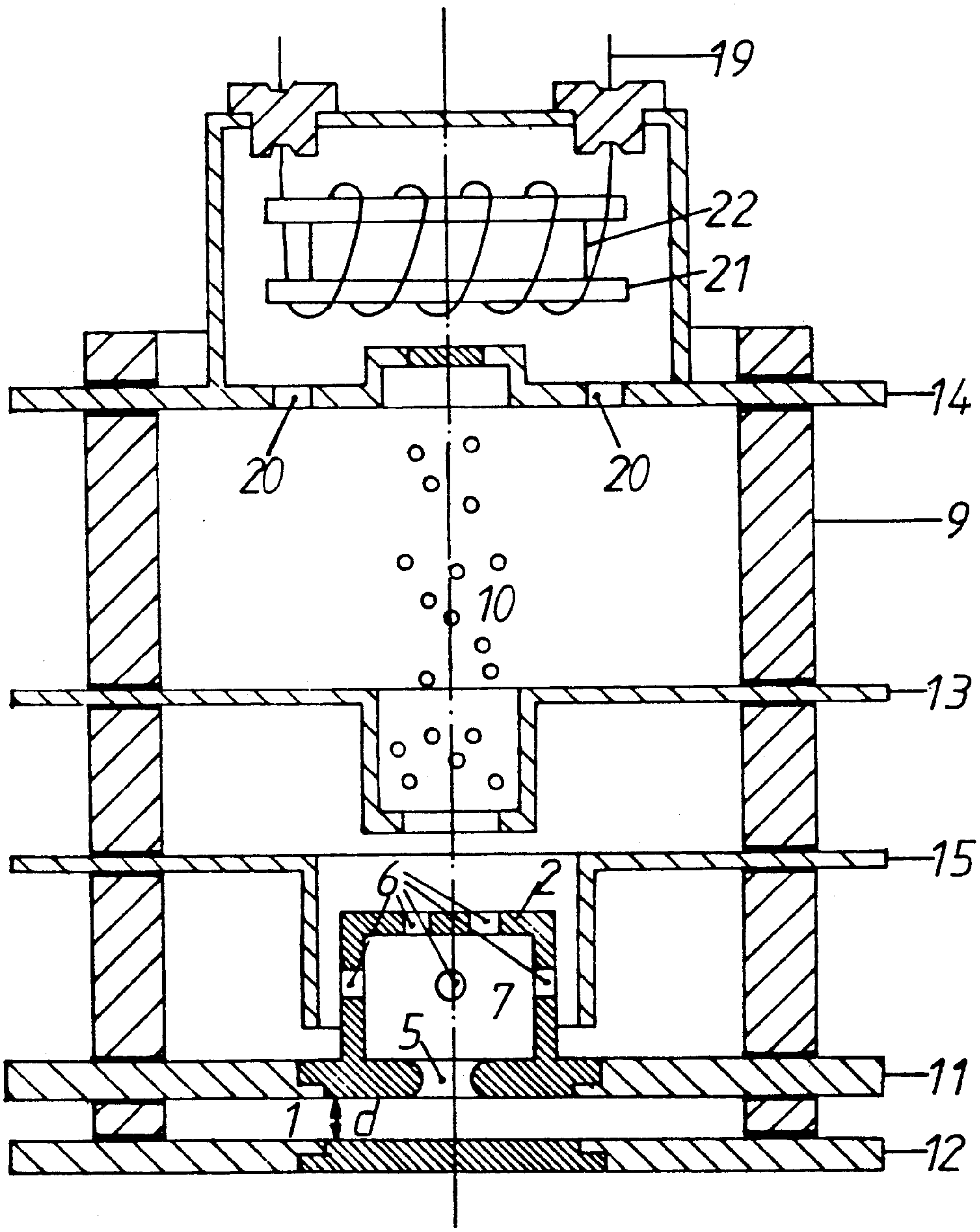
FIG. 9 shows a further illustrative embodiment of a gas discharge chamber for a switch in accordance with the invention, which differs from the illustrative embodiment shown in FIG. 2 in that the cathode and anode consist of flat plates.

In the illustrative embodiment shown in FIG. 9 the switch differs from the one shown in FIG. 2 in that except for the cathode cage 2 the cathode 11 and the anode 12 consist of flat plates. Besides, the anode cage has been omitted as well as the annular gaps.

Moreover, the anode 12 has been simplified in that its central hole has been omitted. Such an embodiment of a pseudospark switch will be suitable for simpler applications in which only relatively low voltages up to about 5 kV are applied across the anode and cathode so that a lower quality of the insulation between the anode and cathode will be permissible.

Figure 10:
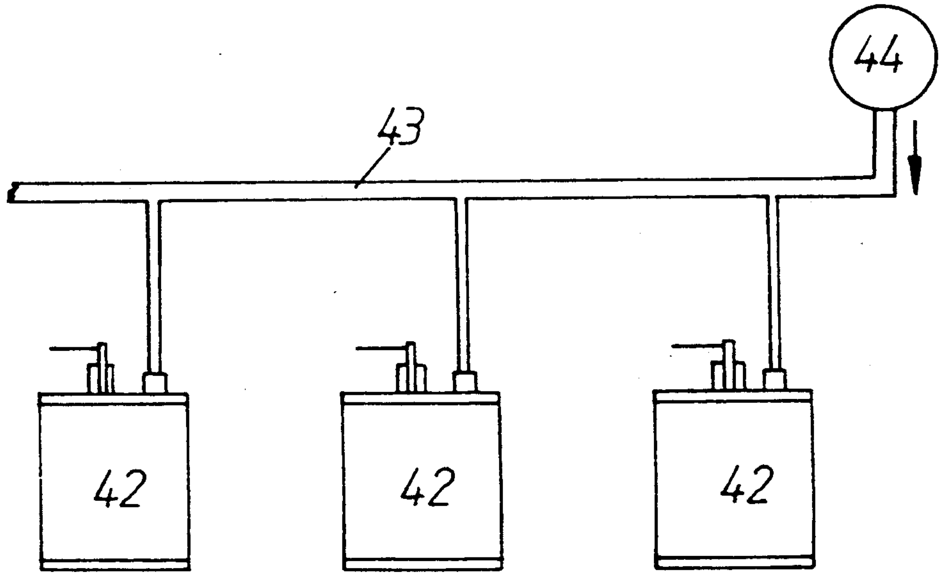
FIG. 10 shows diagrammatically an arrangement comprising a plurality of switches in accordance with the invention, which are supplied jointly and in parallel with the gas in which the gas discharge is effected.

The improved pseudospark switch which is shown in FIG. 10 can be used in systems which are connected in parallel. Particularly because the gas discharge will build up substantially without fluctuations as it is triggered by a glow discharge, pseudospark switches may be operated in parallel if the interval of time in which they are triggered is not too long. It has been found that that interval of time must be of the order of the rise time of the pulse generated by the switch. In low-resistance systems the pulses generated by the switch have a rise time of an order of $10^{-8}$ second so that a plurality of switches can be operated in parallel if the fluctuations occurring during the switching operation are of an order of 1 to 2 ns as is realistic for the switches. Switching arrays having large areas can be assembled in that manner and will have an extremely low inductance and permit a current to be distributed to systems which are connected in parallel so that the load on the individual switching parts will be limited. For a long-time operation of such systems comprising switches having predetermined geometrical dimensions, the total gas pressure in all systems must be maintained at an equal value. For this reason it will be recommendable with view to the gas consumption to establish a communication between the switches 42 and a common pipe system 43, which connects them to a common gas accumulator 44, from which they are supplied with the gas, preferably with the assistance of a pressure regulator.

What is claimed is:

1. A gas-electric switch (pseudospark switch) having a gas discharge chamber, which contains two metal electrodes, namely, a cathode and an anode, said cathode and said anode being separated within said gas discharge chamber by a specific cathode-anode gap, an electrically insulating wall made of ceramic material or glass disposed between said cathode and said anode, said wall being disposed adjacent distal ends of said electrodes, the cathode has a hole and the electrodes are joined to the insulating wall by a tight metal-ceramic joint or fused joint, wherein the gas discharge chamber is filled with an ionizable low-pressure gas under such a pressure p that the product p×d has such a value that a gas discharge between the electrodes will be fired in response to a voltage applied thereto which is disposed in that branch of the firing voltage-pressure characteristic in which the firing voltage decreases as the pressure rises, characterized in that for at least one of the two electrodes, lines of contact at which said electrode, the gas and the insulating wall meet are spaced from the respective opposite electrode by a distance which is larger than said cathode-anode gap, said electrode being separated from said insulating wall by an electrode-insulating wall gap having a width less than said cathode-anode gap.

2. A switch according to claim 1, characterized in that the anode (12) has a hole (8) that is opposite to the hole (5) in the cathode (11).

3. A switch according to claim 1 characterized in that at least those portions of the electrodes (11 to 14), the metal shields (15) and the walls (2) of the cavity (7) behind the cathode (11) as well as the rear wall of the space behind the cathode and optionally also the rear wall of the space behind the anode, at least in those portions which are particularly highly stressed by the gas discharge, are made of a hardmetal, such as tungsten, tantalum, molybdenum, or of alloys containing said metals, or a chromium-copper composite material.

4. A switch according to claim 1, characterized in that one or more metal shields 18 are arranged on the cathode (11) and/or on the anode (12) in such a manner that light from the gas discharge struck between the cathode (11) and the anode (12) in the region between their openings (5, 8) cannot directly reach the insulating wall **(9*a*)** which surrounds the gas discharge chamber.

5. A switch according to claim 1 characterized in that the filling gas consists of hydrogen or heavy hydrogen (deuterium) or of a mixture of said two gases, a hydrogen accumulator consisting of an absorptive metal accumulator (22) is provided, which consists, e.g., of titanium, zirconium and/or palladium or of another metal or of a metal alloy which is adapted to adsorb hydrogen and to subsequently release hydrogen in response to a supply of heat to the accumulator, and heating means (19, 21) and a pressure regulator acting on the heating means are provided so that the pressure of the gas which fills the gas discharge chamber can be automatically controlled at a predetermined value.

6. A switch according to claim 1, characterized in that a cage is provided in the space behind the cathode (11) and is constituted by a cavity (7), which is surrounded by a metal wall (2) and has openings (5, 6), which consist of the hole (5) in the cathode (11) and of at least one additional opening (6), which connects the cavity (7) to the space behind the cathode, two additional electrodes (13, 14) are disposed in the space behind the cathode and are so connected in circuit that a low-pressure gas discharge (10) can be sustained between them, so that when the switch is in a stand-by state, before the pseudospark between the cathode (11) and the anode (12) is fired, a small partial current of charge carriers will flow from the low-pressure gas discharge through the cavity (7) and through the hole (5) in the cathode (11) to the anode (12).

7. A switch according to claim 6, characterized in that the additional electrodes (13, 14) are so connected in circuit that a low-pressure gas discharge is sustained between them throughout the operation of the switch.

8. A switch according to claim 6, characterized in that the additional openings (6) in the wall (2) of the cavity (7) which is disposed behind the cathode (11) and constitutes a cage are so shielded by metal shields (15) or by the additional electrodes (13, 14) in the space behind the cathode that the insulating wall (9b, 9c, 9d, 9e) of the gas discharge chamber cannot be reached on a straight path from the interior of the cavity (7).

9. A switch according to claim 6, characterized in that shields (15, 16, 17) are disposed between the insulating wall (9a to 9e) of the gas discharge chamber and the additional electrodes (13, 14), between which a direct-current glow discharge for triggering the pseudospark is maintained, and said shields (15, 16, 17) are so arranged that the plasma of the glow discharge is substantially unable to illuminate the insulating wall (9a to 9e) on a straight path.

10. A switch according to claim 6, characterized in that a voltage source that is capable of a pulsed operation is provided and is connected either to the additional electrodes (13, 14), between which the low-pressure gas discharge used to fire the pseudospark is sustained, or is connected to auxiliary electrodes, which are disposed in the space behind the cathode and which act in such a manner on the low-pressure gas discharge sustained between the additional electrodes (13, 14) that the injection of charge carriers from that low-pressure gas discharge into the cavity (7) behind the cathode (11) to fire the pseudospark is intensified by pulses.

11. A switch according to claim 6, characterized in that a cage which is constituted by a cavity (23) which is surrounded by a metal wall is provided behind the anode (12).

12. A switch according to claim 11, characterized in that the cavity (23) behind the anode (12) is similar in size to the cavity (7) behind the cathode (11).

13. A switch according to claim 11 characterized in that switching means are provided for interchanging the polarities of the cathode (11) and the anode (12).

14. A switch according to claim 11 characterized in that the cathode (11) has a plurality of holes (24) and each of said holes (24) opens into a cavity (7), which is provided behind the cathode and is surrounded by a metal wall (2) and in which at least one additional opening (6) is provided, which connects the cavity (7) to the space behind the cathode.

15. A switch according to claim 14, characterized in that the holes (24) in the cathode (11) open into a common cavity (7) behind the cathode (11).

16. A switch according to claim 14 characterized in that the anode has holes (8, 25) which are equal in number to those in the cathode (11) and are opposite to an aligned with the holes (5, 24) in the cathode (11).

17. A switch according to claim 14, characterized in that it has an axis of symmetry (40), which extends through the cathode (11) and the anode (12) at right angles thereto and the holes (5, 24; 8, 25) provided in the cathode (11) and optionally in the anode (12) are symmetrically arranged with respect to the axis of symmetry (40).

18. A switch according to claim 1, characterized in that for the cathode and for the anode, the lines of contact at which the metal of the electrode, the gas and the insulating wall meet are spaced from the respective opposite electrode by a distance which is larger than said cathode-anode gap, said electrodes being spaced from the insulating wall by an electrode-insulating wall gap having a width less than said cathode-anode gap.

19. A switch according to claim 18, in which said gap (3) is much smaller than (d).

20. A switch according to claim 17, in which said gap (3) is smaller than 1 mm.

21. A switch according to claim 1, characterized in that said electrode-insulating wall gap is less than said cathode-anode gap.

22. A switch according to claim 21, in which said gap (3) is smaller than 1 mm.

23. A switch according to claim 21, characterized in that the gap (3) is as small as is technically possible.

24. A switch according to claim 1, characterized in that its breakdown voltage is increased by the provision of one or more interposed electrodes (31 and 34), which are disposed between and electrically insulated from the anode (12) and the cathode (11) and have holes (32), which are aligned with the hole (5) and optionally with the additional holes (24) in the cathode (11).

25. A switch according to claim 24, characterized in that at least one of the interposed electrodes (34) is so designed and arranged that for said interposed electrodes the lines of contact (33) where the metal of the interposed electrode (34), the gas and the insulating wall (9) of the gas discharge chamber meet are spaced from the respective adjacent electrode (11 or 12 or 34) by a smallest distance which is larger than the distance between the interposed electrode (34) and the respective adjacent electrode (11 or 12 or 34), adjacent to their holes (5, 8, 35) and that the interposed electrodes (34) are separated from the insulating wall (9) by a gap (3a) which has a width that is smaller than said distance.

26. A switch according to claim 25, characterized in that the interposed electrodes (34) are hollow and in their cavity contain a sheet metal shield (36), which interrupts the straight path between the cathode (11) and the anode (12) and compels the charge carriers to take a detour as they flow from the cathodes (11) to the anode (12).

27. A switch according to claim 1, characterized in that the gas discharge chamber has an inlet (41) for supplying the filling gas from the outside.

28. A switch according to claim 27, further comprising parallel interconnection pipes.

29. A gas-electric switch (pseudospark switch) having a gas discharge chamber, which contains two metal electrodes, namely, a cathode and an anode, said cathode and said anode being separated within said gas discharge chamber by a specific cathode-anode gap, an electrically insulating wall made of ceramic material or glass disposed between said cathode and said anode, said wall being disposed adjacent distal ends of said electrodes, at least the cathode and preferably also the anode is formed with a hole and the electrodes consist of flat plates and are joined to the insulating wall by a tight metal-ceramic joint or fused joint, wherein the gas discharge chamber is filled with an ionizable low-pressure gas under such a pressure p that the product $p \times d$ has such a value that a gas discharge between the electrodes will be fired in response to a voltage applied thereto which is disposed in that branch of the firing voltage-pressure characteristic in which the firing voltage decreases as the pressure rises, characterized in that a cage is provided in the space behind the cathode and is constituted by a cavity, which is surrounded by a metal wall and has openings, which consist of the hole in the cathode and of at least one additional opening, which connects the cavity to the space behind the cathode, two additional electrodes are disposed in the space behind the cathode and are so connected in circuit that a low-pressure gas discharge can be sustained between them, so that when the switch is in a stand-by state, before the pseudospark between the cathode and the anode is fired, a small partial current of charge carriers will flow from the low-pressure gas discharge through the cavity and through the hole in the cathode to the anode.

30. A switch according to claim 29, characterized in that a cavity (23) which is surrounded by a metal wall is also provided behind the anode (12) and is accessible through a hole (8) which is formed in the anode and aligned with the hole (5) in the cathode (11).

* * * * *